United States Patent
Nagayama et al.

(10) Patent No.: US 6,928,840 B1
(45) Date of Patent: Aug. 16, 2005

(54) OPTICAL FIBER PRODUCING METHOD

(75) Inventors: Katsuya Nagayama, Yokohama (JP); Yuichi Ohga, Yokohama (JP); Kazuya Kuwahara, Yokohama (JP); Ichiro Tsuchiya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 464 days.

(21) Appl. No.: 10/089,719

(22) PCT Filed: Oct. 11, 2000

(86) PCT No.: PCT/JP00/07053

§ 371 (c)(1),
(2), (4) Date: Apr. 4, 2002

(87) PCT Pub. No.: WO01/27045

PCT Pub. Date: Apr. 19, 2001

(30) Foreign Application Priority Data

Oct. 12, 1999 (JP) ............................... P11-289736

(51) Int. Cl.[7] .................. C03B 37/025; C03B 37/03
(52) U.S. Cl. ............................ 65/424; 65/435; 65/384; 65/488; 65/507
(58) Field of Search .................... 65/382, 384, 424, 65/430, 431, 432, 435, 447, 475, 477, 488, 65/491, 507, 509, 510, 513, 529, 530, 533, 65/537, 538, 187; 264/1.24, 2.6, 2.7

(56) References Cited

U.S. PATENT DOCUMENTS

| | | | | |
|---|---|---|---|---|
| 4,673,427 A | * | 6/1987 | Van Der Giessen et al. | 65/424 |
| 5,059,229 A | * | 10/1991 | Blankenship et al. | 65/424 |
| 5,284,499 A | * | 2/1994 | Harvey et al. | 65/435 |
| 5,320,658 A | * | 6/1994 | Ohga et al. | 65/435 |
| 5,545,246 A | * | 8/1996 | Lysson et al. | 65/435 |
| 5,897,681 A | * | 4/1999 | Lysson et al. | 65/435 |
| 6,010,741 A | * | 1/2000 | Rosenkranz et al. | 427/9 |

FOREIGN PATENT DOCUMENTS

| | | | | |
|---|---|---|---|---|
| EP | 0 321 182 | * | 6/1989 | C03B 37/025 |
| EP | 0 464 613 A1 | | 1/1992 | |

(Continued)

*Primary Examiner*—Eric Hug
(74) *Attorney, Agent, or Firm*—McDermott Will & Emery LLP (57) ABSTRACT

A drawing apparatus 1 comprises a drawing furnace 11, a protecting tube 21, and a resin curing unit 31. A buffer chamber 41 is disposed between the drawing furnace 11 and the protecting tube 21, and has a length L1 in the drawing direction of the optical fiber 3. The buffer chamber 41 is constituted by a first buffer cell 42 and a second buffer cell 45. In the space within the buffer chamber 41, an He gas, which is an atmosphere gas within the drawing furnace 11, and the air, which is an atmosphere gas within the protecting tube 21, exist in a mixed state. The optical fiber 3 drawn upon heating in the drawing furnace 11 is fed to the protecting tube 21, and a predetermined part of the optical fiber 3 is annealed at a predetermined cooling rate. Thereafter, a coating die 62 coats the optical fiber 3 with a UV resin solution 63, and the resin curing unit 31 cures the UV resin 63, whereby a coated optical fiber 4 is obtained.

2 Claims, 7 Drawing Sheets

FOREIGN PATENT DOCUMENTS

| | | | | |
|---|---|---|---|---|
| EP | 1 205 449 A1 | 5/2002 | | |
| EP | 1 243 568 A1 | 9/2002 | | |
| JP | 60-046954 | 3/1985 | | |
| JP | 62-246837 | 10/1987 | | |
| JP | 1-275443 | 11/1989 | | |
| JP | 01-275443 | 11/1989 | | |
| JP | 2-243532 | 9/1990 | | |
| JP | 3-237037 | 10/1991 | | |
| JP | 05-105472 | 4/1993 | | |
| JP | 5-105472 | 4/1993 | | |
| JP | 06-048780 | 2/1994 | | |
| JP | 6-271330 | 9/1994 | | |
| JP | 06-271330 | 9/1994 | | |
| JP | 11-116264 | * 4/1999 | ......... C03B 37/029 |
| JP | 11-116264 A | 4/1999 | | |
| JP | 2000-128566 | 5/2000 | | |
| JP | 2000-335933 | 12/2000 | | |
| JP | 2000-335934 | 12/2000 | | |
| JP | 2000-335935 | 12/2000 | | |

* cited by examiner

| | DRAWING RATE (m/MIN) | ENTRANCE TEMPERATURE TO BUFFER CHAMBER (°C) | FLUCTUATION IN OPTICAL FIBER DIAMETER (μm) | BENDING ABNORMALITY RATIO (%) | TRANSMISSION LOSS (dB/km) | RAYLEIGH SCATTERING COEFFICIENT (dB·μm⁴/km) |
|---|---|---|---|---|---|---|
| EXAMPLE 1 | 400 | 1800 | ±0.15 | 0 | 0.170 | 0.85 |
| EXAMPLE 2 | 400 | 1800 | ±0.15 | 0 | 0.170 | 0.85 |
| EXAMPLE 3 | 400 | 1800 | ±0.15 | 0 | 0.170 | 0.85 |
| COMPARATIVE EXAMPLE 1 | 400 | — | ±0.4 | 20 | 0.172 | 0.86 |
| COMPARATIVE EXAMPLE 1 | 400 | — | ±0.15 | 0 | 0.175 | 0.87 |
| COMPARATIVE EXAMPLE 1 | 400 | — | ±0.1 | 30 | 0.170 | 0.85 |
| COMPARATIVE EXAMPLE 1 | 100 | 1300 | ±0.15 | 0 | 0.175 | 0.87 |

OPTICAL FIBER PRODUCING METHOD

TECHNICAL FIELD

The present invention relates to a method of making an optical fiber whose transmission loss is lowered by reducing its Rayleigh scattering intensity.

BACKGROUND ART

A drawing technique for drawing an optical fiber from an optical fiber preform having a large diameter (e.g., 70 mm) has been coming into common use due to demands for cutting down the cost of optical fiber, and the like. In the case where an optical fiber preform having a large thickness is to be drawn, the space surrounding its neck-down part becomes greater, whereby the gas flowing through this space exhibits an uneven temperature distribution. As a consequence, turbulence occurs in the gas flow in the space near the neck-down part, whereby the optical fiber diameter fluctuates greatly. For restraining the optical fiber diameter from fluctuating, there is a case where an He gas having a high thermal conductivity is used as the atmosphere gas within the drawing furnace.

Also known is a technique in which the drawing furnace is provided with a muffle tube extension (also called as a lower chimney) in order to isolate the optical fiber immediately after drawing from the outside air.

DISCLOSURE OF THE INVENTION

It is an object of the present invention to provide a method of making an optical fiber, which can make an optical fiber whose transmission loss is lowered by reducing its Rayleigh scattering intensity even when the He gas having a high thermal conductivity is used as an atmosphere gas within the drawing furnace.

The inventors conducted diligent studies concerning the method of making an optical fiber whose transmission loss is lowered by reducing its Rayleigh scattering intensity, and have newly found the following fact concerning the relationship between the Rayleigh scattering intensity and the cooling rate of the drawn optical fiber.

Within glass at a high temperature, atoms are vigorously vibrating due to thermal energy, whereby its atomic arrangement is in a state more random than that of glass at a low temperature. In the case where glass at a high temperature is slowly cooled, atoms are cooled while being arranged at a randomness corresponding to each temperature within the temperature range where atoms are allowed to be rearranged, whereby the randomness of atoms within the glass attains a state corresponding to the lowest temperature (about 1200° C.) at which structural relaxation proceeds. When glass at a high temperature is cooled drastically, the atomic arrangement is fixed upon cooling before reaching an equilibrium state corresponding to each temperature, whereby a state more random than that obtained upon slow cooling is obtained. The Rayleigh scattering intensity becomes higher as the atomic arrangement is more random even in the same substance. In an optical fiber cooled at a cooling rate of about 5000 to 30000° C./sec after drawing has an atomic arrangement more random than that of bulk glass, thereby attaining a state having a high virtual temperature. This is considered to be a reason why the optical fiber usually attains a high Rayleigh scattering intensity.

Meanwhile, the time required for structural relaxation becomes longer as the temperature is lower, whereby no structural relaxation occurs at a temperature of about 1200° C., for example, unless this temperature is maintained for several tens of hours. The drawn optical fiber is usually cooled from about 2000° C. to about 400° C. within a fraction of a second. For lowering the virtual temperature in a short period of time during which the optical fiber in the process of drawing is cooled, so as to make it approach 1200° C., it is necessary for the drawn optical fiber to be annealed in a state having a temperature higher than 1200° C.

Figure 7:
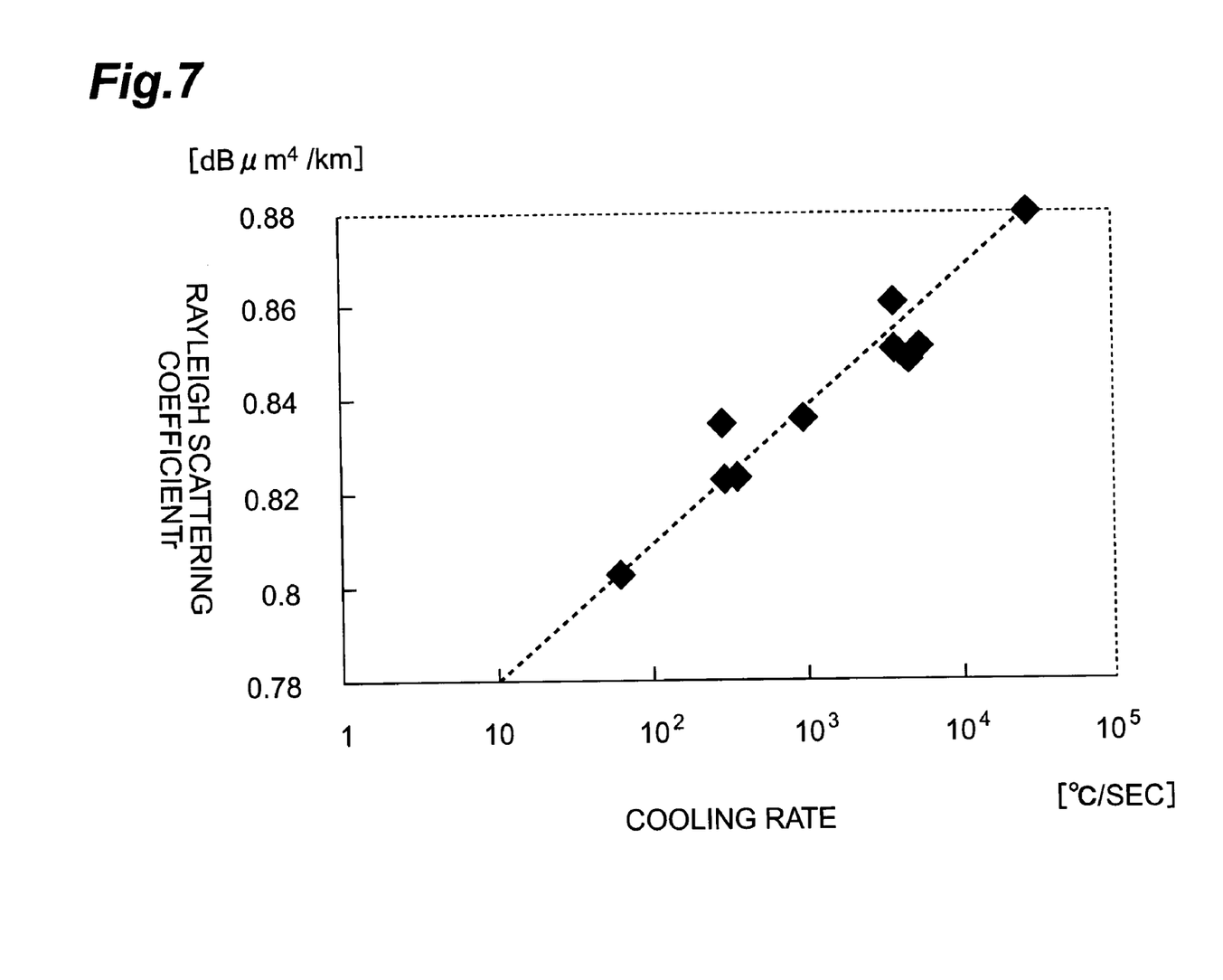
FIG. 7 is a graph showing the relationship between the cooling rate and Rayleigh scattering coefficient of an optical fiber preform.

Therefore, taking account of the optical fiber temperature and cooling rate after drawing, the inventors investigated the relationship between its Rayleigh scattering ratio and the cooling rate of a pure silica core fiber in a part where its temperature ranges from 1200 to 1700° C., thus being higher than the above-mentioned lowest temperature (about 1200° C.) where the structural relaxation proceeds but not higher than 1700° C. where the structural relaxation proceeds in a very short period of time. As a result, it has been seen that the relationship shown in FIG. 7 exists between the cooling rate and Rayleigh scattering ratio in the part of pure silica core fiber where the temperature ranges from 1200 to 1700° C. The Rayleigh scattering intensity (I) is inversely proportional to wavelength ($\lambda$) to the fourth power as represented by the following expression (1):

$$I = A/\lambda^4 \qquad (1)$$

where the ratio A is defined as the Rayleigh scattering ratio.

From these results, it has been found that, when the cooling rate of the drawn optical fiber, a predetermined segment in a part where the optical fiber has a temperature ranging from 1200 to 1700° C. in particular, is slowed down, the Rayleigh scattering intensity of the optical fiber can be reduced, so as to lower the transmission loss.

Also, the inventors have newly found a relationship between the length of the lower chimney and the transmission loss. When the lower chimney is set relatively long, the optical fiber is rapidly cooled within the lower chimney by the He gas having a high thermal conductivity, so that the Rayleigh scattering intensity of the optical fiber cannot be reduced, whereby the transmission loss increases.

When the lower chimney is set shorter in order to restrain the optical fiber from being rapidly cooled within the lower chimney by the He gas, the optical fiber coming out of the lower chimney is slowly cooled by the outside air having a thermal conductivity lower than that of the He gas, so that the Rayleigh scattering intensity of the optical fiber is reduced, whereby the transmission loss is lowered. This case, however, is problematic in that the optical fiber comes into contact with an unstable flow of outside air, whereby its diameter fluctuates greatly.

Meanwhile, there is commonly-assigned Japanese Patent Application Laid-Open No. HEI 6-48780 concerning a method and apparatus for making a hermetic coat fiber. In the technique disclosed in Japanese Patent Application Laid-Open No. HEI 6-48780, an He gas atmosphere is attained within a drawing furnace, while a material gas (hydrocarbon) is decomposed within a reaction tube provided in the lower part of the drawing furnace, so as to provide a hermetic coating on the optical fiber surface, whereas a buffer chamber is disposed between the lower part of the drawing furnace and the reaction tube, so as to let out the He gas from the buffer chamber. However, Japanese Patent Application Laid-Open No. HEI 6-48780 neither discloses nor suggests the point newly found by the inventors, i.e., the point that slowing down the cooling rate in a predetermined segment in a part where the optical fiber has a temperature ranging from 1200 to 1700° C. can reduce the Rayleigh scattering intensity of the optical fiber and lower the transmission loss thereof.

In order to achieve the above-mentioned object in view of the foregoing results of studies, the method of making an optical fiber in accordance with the present invention is a method of making an optical fiber in which an optical fiber preform is drawn upon heating, the method using a drawing furnace for drawing the optical fiber preform upon heating in an atmosphere comprising an He gas, and using a protecting tube, disposed with a predetermined gap with respect to the drawing furnace, having therewithin an atmosphere comprising a predetermined gas with a thermal conductivity lower than that of the He gas; wherein the gap between the drawing furnace and the protecting tube is a gas mixture layer in which the He gas and the predetermined gas exist in a mixed state; and wherein the drawn optical fiber enters the gas mixture layer at an entrance temperature within the range of 1400 to 1800° C., while the optical fiber drawn by the drawing furnace is fed into the protecting tube by way of the gas mixture layer.

In the method of making an optical fiber in accordance with the present invention, a protecting tube is provided with a predetermined gap with respect to a drawing furnace, whereas this gap is a gas mixture layer in which a first gas having a predetermined thermal conductivity and a second gas having a predetermined thermal conductivity exist in a mixed state, whereby an atmosphere comprising the He gas is kept within the drawing furnace. Also, an atmosphere comprising a predetermined gas is kept within the protecting tube, whereby the cooling rate of the optical fiber within the protecting tube can be slowed down. In particular, since the drawn optical fiber enters the gas mixture layer at an entrance temperature within the range of 1400 to 1800° C., the cooling rate in a predetermined segment in a part where the optical fiber has a temperature of 1200 to 1700° C. slows down. This lowers the virtual temperature of the optical fiber, so as to reduce the randomness in atomic arrangement, whereby it becomes possible to make an optical fiber whose transmission loss is lowered by reducing its Rayleigh scattering intensity in a very short period of time from the drawing upon heating to the resin coating.

Also, the existence of the gas mixture layer between the protecting tube and the drawing furnace can restrain the dust occurring within the drawing furnace from entering the protecting tube. Further, since the gas mixture layer exists, the turbulence of outside air flow between the drawing furnace and the protecting tube becomes less influential, whereby the occurrence of the fluctuation in optical fiber diameter or the deterioration in bending of the optical fiber can be suppressed.

The present invention may be characterized in that a barrier for separating the gas mixture layer from the outside air is provided, the barrier is formed with a gas outlet for letting out at least the He gas, and at least the He gas is let out from the gas outlet to the outside air.

Providing the barrier makes the turbulence of outside air flow further less influential, whereby the occurrence of the fluctuation in optical fiber diameter or the deterioration in bending of the optical fiber can further be suppressed. Letting out at least the He gas from the gas outlet formed in the barrier to the outside air makes it possible to switch between the He gas atmosphere within the drawing furnace and the predetermined gas atmosphere within the protecting tube efficiently and reliably.

The present invention may also be characterized in that the barrier is formed with a gas inlet for introducing the predetermined gas, and the predetermined gas is introduced inside the barrier from the gas inlet.

When the predetermined gas is introduced inside the barrier by way of the gas inlet formed in the barrier, the He gas is actively let out from the gas outlet, whereby the dust occurring within the drawing furnace can further be restrained from entering the protecting tube.

BEST MODES FOR CARRYING OUT THE INVENTION

Embodiments of the present invention will be explained with reference to the drawings. In the explanation of the drawings, constituents identical to each other will be referred to with numerals identical to each other without repeating their overlapping descriptions.

First Embodiment

Figure 1:
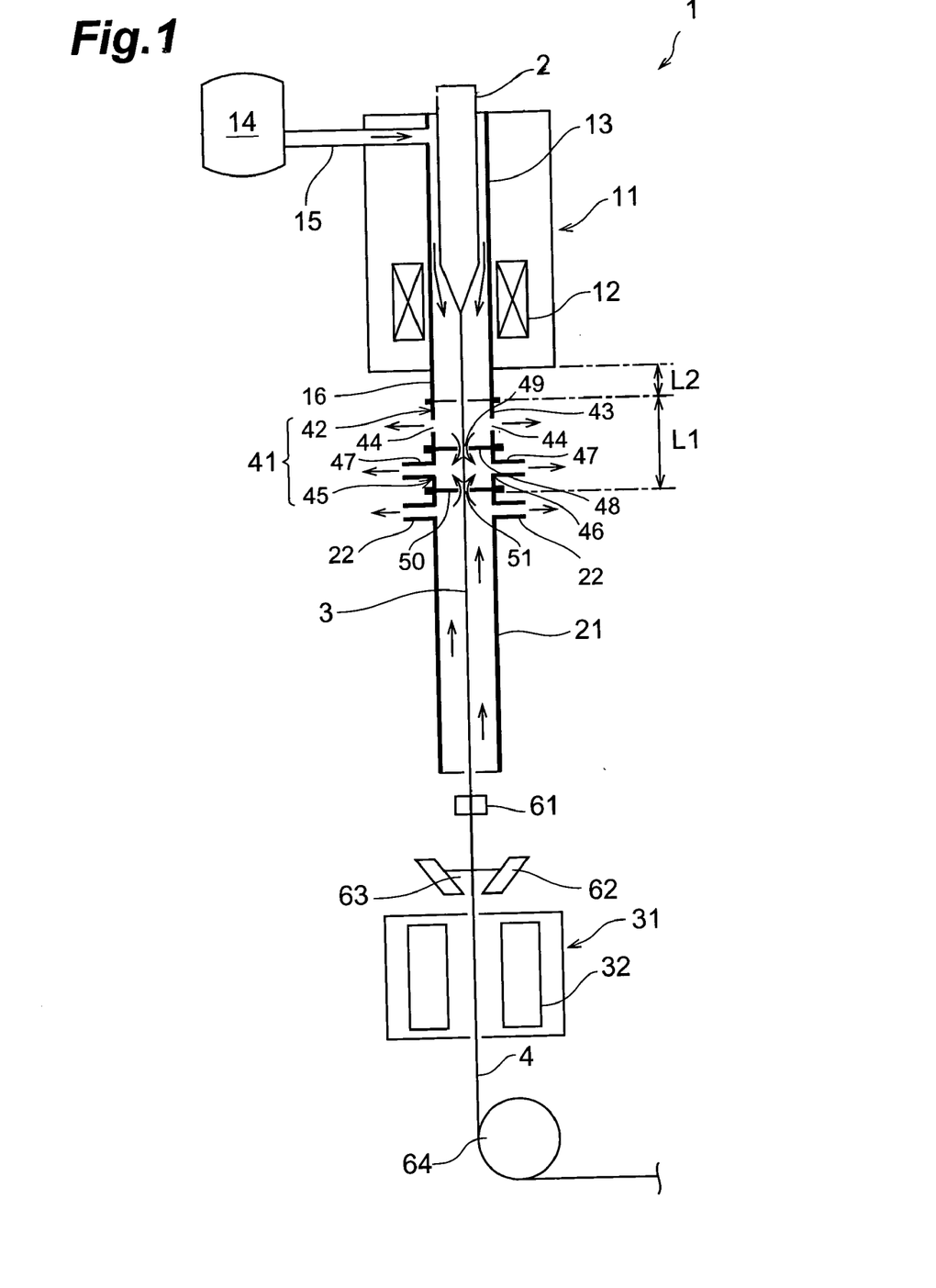
FIG. 1 is a schematic explanatory view showing a first embodiment of the method of making an optical fiber in accordance with the present invention.

To begin with, a first embodiment of the method of making an optical fiber in accordance with the present invention and the drawing apparatus used in this method will be explained with reference to FIG. 1.

This drawing apparatus 1 is a drawing apparatus for silica type optical fibers; and comprises a drawing furnace 11, a protecting tube 21, and a resin curing unit 31. The drawing furnace 11, protecting tube 21, and resin curing unit 31 are disposed in this order in the drawing direction of an optical fiber preform 2 (from the upper side to the lower side in FIG. 1). The optical fiber preform 2 held by a preform supply apparatus (not depicted) is supplied to the drawing furnace 11, the lower end of the optical fiber preform 2 is heated and softened by a heater 12 within the drawing furnace 11, and an optical fiber 3 is drawn. An He gas supply path 15 from an He gas supply unit 14 is connected to a muffle tube 13 of the drawing furnace 11, whereby the muffle tube 13 within the drawing furnace 11 attains an atmosphere constituted by an He gas. The optical fiber 3 drawn upon heating is cooled by the He gas within the muffle tube 13. Thereafter, the optical fiber 3 passes through a muffle tube extension 16. The He gas has a thermal conductivity λ (T=300 K) of 150 mW/(m·K).

The protecting tube 21 is disposed with a predetermined gap L1 with respect to the muffle tube extension 16. The end part of the protecting tube 21 on the drawing furnace 11 side is formed with a plurality of outlet ducts 22 for letting out the He gas flowing from within the drawing furnace 11 and the dust occurring within the drawing furnace 11. The protecting tube 21 is configured such that it communicates with the outside air and attains therewithin an atmosphere constituted by the air. The air has a thermal conductivity λ (T=300 K) of 26 mW/(m·K), which is lower than that of the He gas. Here, as a predetermined gas having a thermal conductivity lower than that of the He gas, a gas having a relatively large molecular weight such as $N_2$ or Ar can be used in place of the air. When a gas such as $N_2$ or Ar is used, the gas supply unit as a source for the second gas is configured so as to connect with the protecting tube 21 by way of a gas supply path. It is not always necessary to form the outlet ducts 22. Unlike the reaction tube disclosed in Japanese Patent Application Laid-Open No. HEI 6-48780, the protecting tube 21 is not used for carrying out hermetic coating, and thus is not configured such that a material gas such as hydrocarbon is supplied thereto. The arrows depicted within the protecting tube 21 show upward flows occurring due to the fact that the protecting tube 21 is warmed up by the optical fiber 3.

Within the protecting tube 21, the optical fiber 3 is cooled with the air. Therefore, the cooling in the protecting tube 21 is carried out such that, in the part of drawn optical fiber 3 attaining a temperature of 1200 to 1700° C., a segment where the optical fiber 3 yields a temperature difference of at least 50° C., e.g., the portion where the optical fiber 3 attains a temperature of 1500 to 1700° C. (a segment yielding a temperature difference of 200° C.), is cooled at a cooling rate (of about 4000 to 6000° C./sec) slower than the cooling rate (of about 20000 to 30000° C./sec) in the He gas.

The installing position of the protecting tube 21 and its total length in the drawing direction of the optical fiber preform 2 (vertical direction in FIG. 1) are set in view of the drawing rate such that the above-mentioned segment where the optical fiber 3 yields a temperature difference of at least 50° C. in the portion where the optical fiber 3 attains a temperature of 1200 to 1700° C. is positioned in the protecting tube 21 so as to be cooled. Here, it is necessary to take account of the drawing rate because of the fact that the position at which the optical fiber 3 attains the same temperature shifts downward as the drawing rate is higher.

A buffer chamber 41 is disposed between the muffle tube extension 16 and the protecting tube 21. The length of the buffer chamber 41 in the drawing direction of the optical fiber 3 is substantially L1 as shown in FIG. 1. A slight gap (e.g., about 1 to 1.5 cm) exists between the muffle tube extension 16 and the buffer chamber 41, so that the muffle tube extension 16 and the buffer chamber 41 are not directly connected to each other. It is not always necessary to form a gap between the muffle tube extension 16 and the buffer chamber 41. The muffle tube extension 16 and the buffer chamber 41 may be configured so as to come into close contact with each other. It is sufficient for the gap between the muffle tube extension 16 and the buffer chamber 41 to have such a length that the outside air is prevented from entering the muffle tube extension 16 and the buffer chamber 41.

The buffer chamber 41 is constituted by a first buffer cell 42 and a second buffer cell 45. In the space within the buffer chamber 41 (the first buffer cell 42 and the second buffer cell 45), the He gas, which is the atmosphere gas within the drawing furnace 11 (the muffle tube 13), and the air, which is the atmosphere gas within the protecting tube 21, exist in a mixed state.

The first buffer cell 42 has a barrier 43 for separating the inner space, through which the optical fiber 3 passes, from the outside air. The barrier 43 is formed with a plurality of outlet holes 44 for letting out the He gas flowing from within the drawing furnace 11 and the dust occurring within the drawing furnace 11. The second buffer cell 45 has a barrier 46 for separating the inner space, through which the optical fiber 3 passes, from the outside air. The barrier 46 is formed with a plurality of outlet ducts 47 for letting out the He gas flowing from within the drawing furnace 11 and the dust occurring within the drawing furnace 11.

The first buffer cell 42 and the second buffer cell 45 are partitioned with a partition wall 48. The partition wall 48 is formed with an optical fiber passage hole 49 through which the optical fiber 3 passes. The inner diameter of the optical fiber passage hole 49 is set to about 4 to 5 mm. The optical fiber passage hole 49 restrains the He gas and the dust occurring within the drawing furnace 11 from entering the second buffer cell 45 from the first buffer cell 42. The second buffer cell 45 and the protecting tube 21 are partitioned with a partition wall 50. The partition wall 50 is formed with an optical fiber passage hole 51 through which the optical fiber 3 passes. As with the optical fiber passage hole 49, the optical fiber passage hole 51 has an inner diameter set to about 4 to 5 mm. The optical fiber passage hole 51 restrains the He gas and the dust occurring within the drawing furnace 11 from entering the protecting tube 21 from the second buffer cell 45. The configuration may also be such that an $N_2$ gas or the like is supplied from the outlet ducts 47 or 22 so as to actively let out the He gas flowing from within the drawing furnace 11 and the dust occurring within the drawing furnace 11. Here, a plurality of outlet ducts 22, 47 are provided, so as to separately act as ducts for supplying the $N_2$ gas or the like, and ducts for letting out thus supplied $N_2$ gas or the like and the He gas or the like flowing from within the drawing furnace 11.

The optical fiber 3 coming out of the muffle tube extension 16 successively enters the buffer chamber 41 (the first buffer cell 42 and second buffer cell 45) and, while in a state restrained by the buffer chamber 41 (the first buffer cell 42 and second buffer cell 45) from coming into contact with the outside air, enters the protecting tube 21. The entrance temperature at which the optical fiber 3 enters the buffer chamber 41 (the first buffer cell 42) is set to a temperature within the range of 1400 to 1800° C. such that a segment where the optical fiber 3 yields a temperature difference of at least 50° C. in the part of optical fiber 3 attaining a temperature of 1200 to 1700° C. is cooled within the protecting tube 21. In particular, it is desirable that the entrance temperature at which the optical fiber 3 enters the buffer chamber 41 (the first buffer cell 42) be set to a temperature within the range of 1600 to 1800° C. When the entrance temperature falls within the range of 1600 to 1800° C. as such, cooling with a slowed cooling rate can be carried out from the state where the temperature is relatively high, whereby it is possible to make the optical fiber 3 whose transmission loss is further lowered by reducing its Rayleigh scattering intensity. In the case of defining the entrance temperature at which the optical fiber 3 enters the protecting tube 21, it is desirable that the entrance temperature to the protecting tube 21 be set to a temperature within the range of 1500 to 1800° C.

The outer diameter of the optical fiber 3 coming out of the protecting tube 21 is measured online by an outer diameter meter 61. Thus measured value is fed back to a drive motor (not depicted) for driving a device (not depicted) for taking up the optical fiber to rotate, whereby the outer diameter is controlled so as to attain a constant outer diameter. Thereafter, a coating die 62 coats the optical fiber 3 with a UV resin 63, and a UV lamp 32 in the resin curing unit 31 cures the UV resin 63, whereby a coated optical fiber 4 is obtained. Byway of a guide roller 64, the coated optical fiber 4 is taken up by a drum. In place of the UV resin 63, a thermosetting resin may be used so as to be cured by a heating furnace.

Second Embodiment

Figure 2:
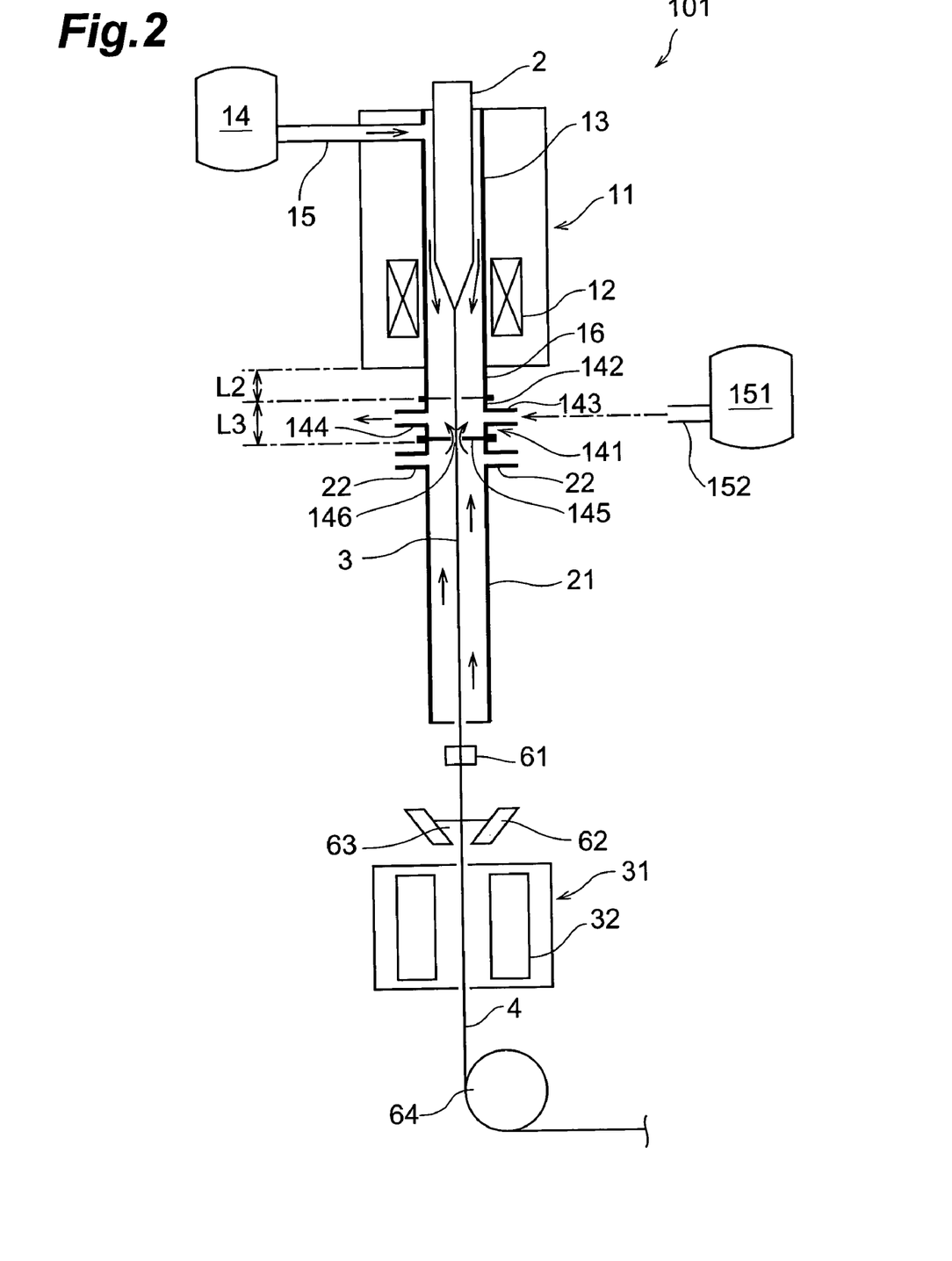
FIG. 2 is a schematic explanatory view showing a second embodiment of the method of making an optical fiber in accordance with the present invention.

With reference to FIG. 2, a second embodiment of the method of making an optical fiber in accordance with the present invention and the drawing apparatus used for this method will now be explained. The second embodiment differs from the first embodiment in the structure of the buffer chamber.

In this drawing apparatus 101, a buffer chamber 141 is disposed between the muffle tube extension 16 and the protecting tube 21. The buffer chamber 141 has a length of L3 in the drawing direction of the optical fiber 3 as shown in FIG. 2. In the space within the buffer chamber 141, the He gas, which is an atmosphere gas within the drawing furnace 11 (the muffle tube 13), and the air, which is an atmosphere gas within the protecting tube 21, exist in a mixed state. It is not always necessary to provide the outlet ducts 22.

The buffer chamber 141 has a barrier 142 for separating the inner space, through which the optical fiber 3 passes, from the outside air. The barrier 142 is formed with an inlet duct 143 for introducing an $N_2$ gas into the buffer chamber 141. The $N_2$ gas is fed to the inlet duct 143 from an $N_2$ gas supply unit 151 by way of an $N_2$ gas supply path 152. The barrier 142 is also formed with an outlet duct 144 for letting out the He gas flowing from within the drawing furnace 11 and the dust occurring within the drawing furnace 11. The buffer chamber 141 and the protecting tube 121 are partitioned with a partition wall 145. The partition wall 145 is formed with an optical fiber passage hole 146 through which the optical fiber 3 passes. The optical fiber passage hole 146 is set so as to have an inner diameter of about 4 to 5 mm. The predetermined gas introduced into the buffer chamber 141 is not limited to the $N_2$ gas, whereby the air and the like may also be employed. A major part of the gas introduced into the buffer chamber 141 is let out from the outlet duct 144. Here, the $N_2$ gas or the like is not introduced for filling the protecting tube 21 with the $N_2$ gas or the like, but for preventing the He gas or the like from flowing into the protecting tube 21.

Third Embodiment

Figure 3:
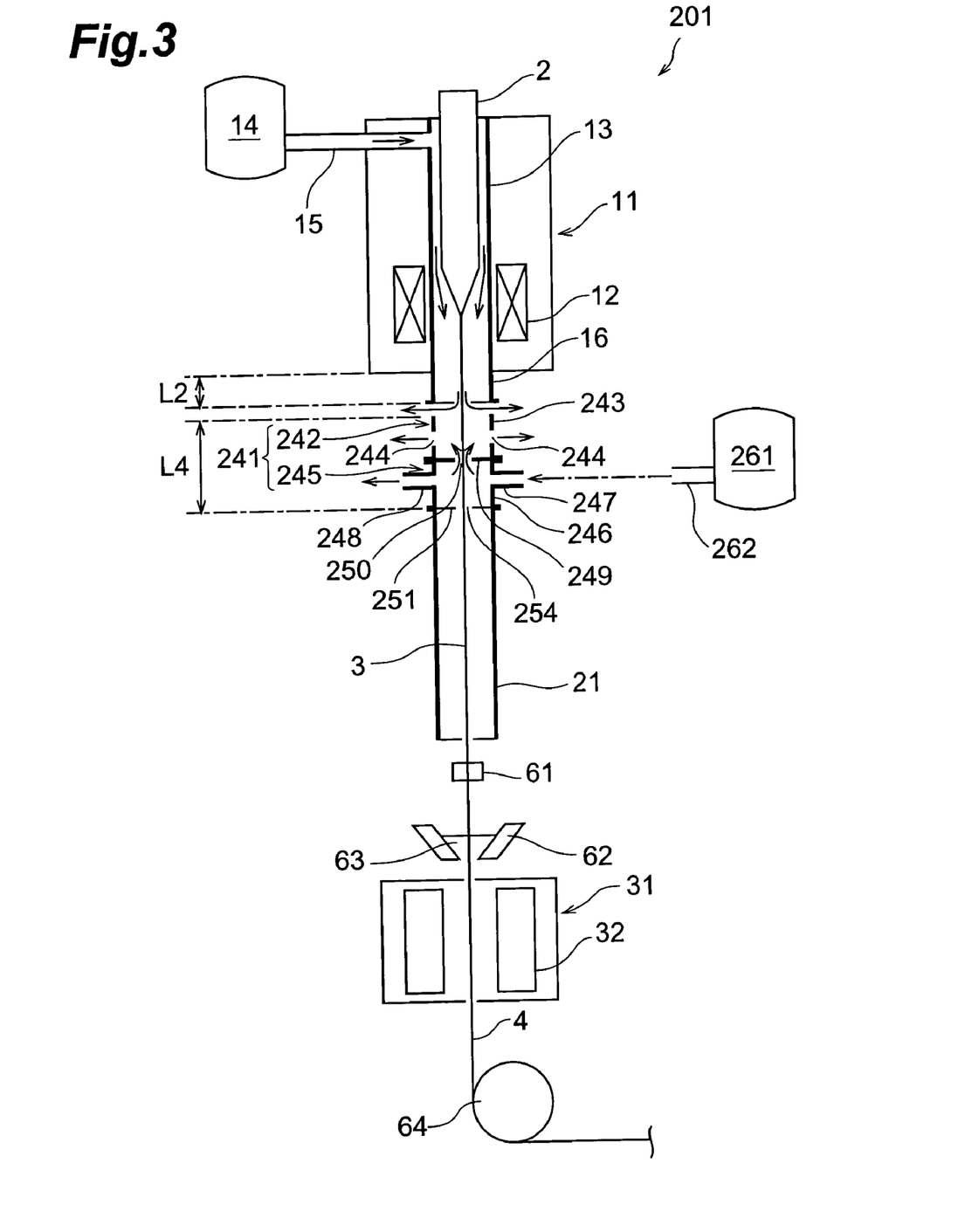
FIG. 3 is a schematic explanatory view showing a third embodiment of the method of making an optical fiber in accordance with the present invention.

With reference to FIG. 3, a third embodiment of the method of making an optical fiber in accordance with the present invention and the drawing apparatus used for this method will now be explained. The third embodiment differs from the first and second embodiments in the structure of the buffer chamber.

In this drawing apparatus 201, a buffer chamber 241 is disposed between the muffle tube extension 16 and the protecting tube 21. The buffer chamber 241 has a length of L4 in the drawing direction of the optical fiber 3 as shown in FIG. 3.

A slight gap (e.g., about 1 to 1.5 cm) exists between the muffle tube extension 16 and the buffer chamber 241, whereby the muffle tube extension 16 and the buffer chamber 241 are not directly connected to each other. It is not always necessary to provide a gap between the muffle tube extension 16 and the buffer chamber 241. They may also be configured so as to come into close contact with each other. It is sufficient for the gap between the muffle tube extension 16 and the buffer chamber 241 to have such a length that the outside air can be prevented from entering the muffle tube extension 16 and the buffer chamber 241. The He gas flowing from within the drawing furnace 11 and the dust occurring within the drawing furnace 11 are mainly let out from the gap between the muffle tube extension 16 and the buffer chamber 241.

The buffer chamber 241 is constituted by a first buffer cell 242 and a second buffer cell 245. In the space within the first buffer cell 242, the He gas, which is an atmosphere gas within the drawing furnace 11 (the muffle tube 13), and the air or $N_2$ gas supplied to the second buffer cell 245 generally exist in a mixed state. The air, which is an atmosphere gas within the protecting tube 21, may exist in the space within the first buffer cell 242. The supplied air or $N_2$ gas and the air, which is an atmosphere gas within the protecting tube 21, generally exist in a mixed state in the space within the second buffer cell 245.

The first buffer cell 242 has a barrier 243 for separating the inner space, through which the optical fiber 3 passes, from the outside air. The barrier 243 is formed with a plurality of outlet holes 244 for letting out the He gas flowing from within the drawing furnace 11 and the dust occurring within the drawing furnace 11, or the air or $N_2$ gas supplied to the second buffer cell 245.

The second buffer cell 245 has a barrier 246 for separating the inner space, through which the optical fiber 3 passes, from the outside air. The barrier 246 is formed with an inlet duct 247 for introducing the air or $N_2$ gas into the second buffer cell 245. The air or $N_2$ gas is fed to the inlet duct 247 from a gas supply unit 261 by way of a gas supply path 262. The barrier 246 is also formed with an outlet duct 248 for letting out the supplied air or $N_2$ gas.

The first buffer cell 242 and the second buffer cell 245 are partitioned with a partition wall 249. The partition wall 249 is formed with an optical fiber passage hole 250 through which the optical fiber 3 passes. The optical fiber passage hole 250 has an inner diameter set to about 4 to 5 mm. The optical fiber passage hole 250 restrains the He gas and the dust occurring in the drawing furnace 11 from entering the second buffer cell 245 from the first buffer cell 242.

The buffer chamber 241 (second buffer cell 245) and the protecting tube 21 are partitioned with a partition wall 251. The partition wall 251 is formed with an optical fiber passage hole 254 through which the optical fiber 3 passes. The optical fiber passage hole 254 has an inner diameter set to about 4 to 5 mm. A major part of the gas introduced into the second buffer cell 245 is let out from the outlet duct 248. Here, the $N_2$ gas or the like is not introduced for filling the protecting tube 21 with the $N_2$ gas or the like, but for preventing the He gas or the like from flowing into the protecting tube 21.

When the amount of the air or $N_2$ gas introduced into the second buffer cell 245 from the gas supply unit 261 by way of the gas supply path 262 and inlet duct 247 is large, the air or $N_2$ gas introduced in the second buffer cell 245 flows into the protecting tube 21 by way of the optical fiber passage hole 254 in the partition wall 251. As a consequence, a downward flow (in the drawing direction) occurs within the protecting tube 21. When the amount of the air or $N_2$ gas introduced into the second buffer cell 245 from the gas supply unit 261 by way of the gas supply path 262 and inlet duct 247 is small, an upward flow (opposing the drawing direction) occurs within the protecting tube 21.

Figure 4:
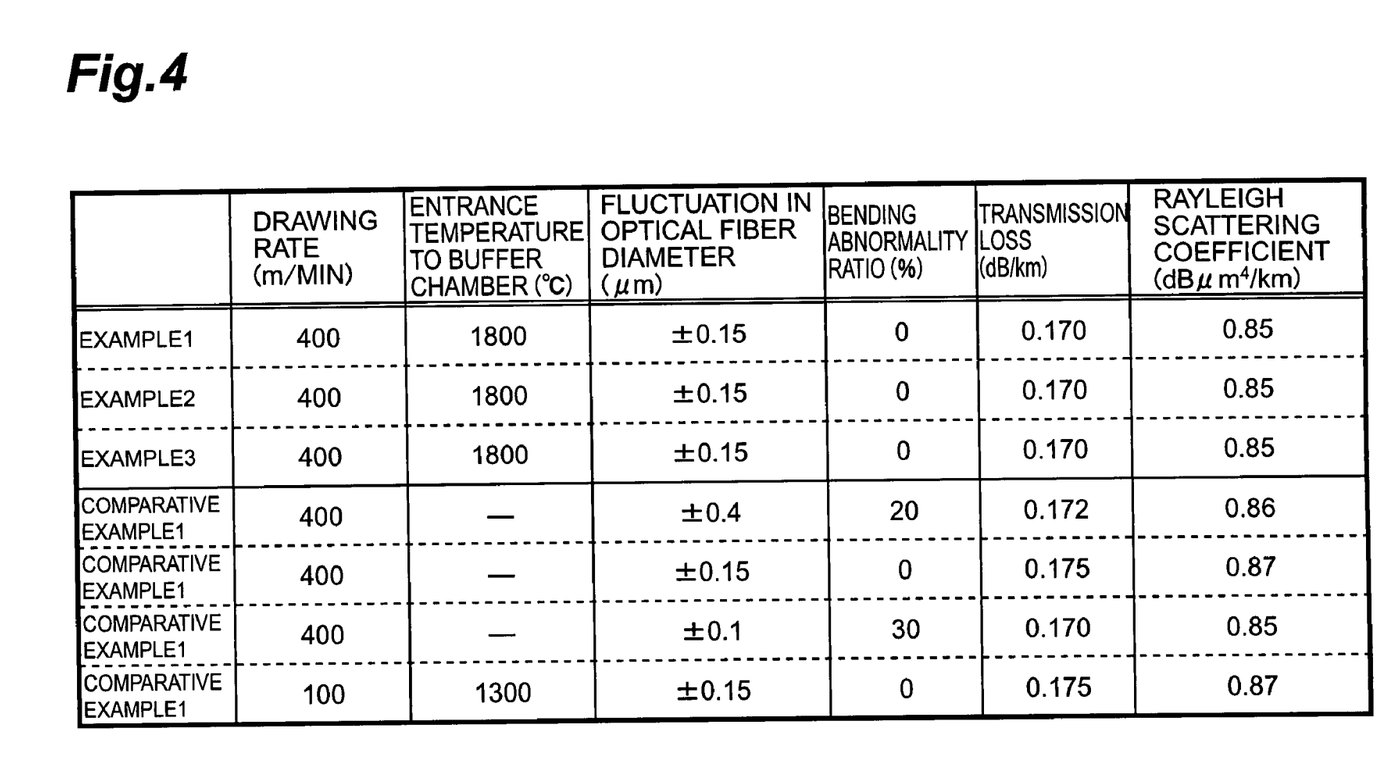
FIG. 4 is a table showing Examples based on the method of making an optical fiber in accordance with the present invention and Comparative Examples.

Results of experiments carried out while using the above-mentioned drawing apparatus 1, 201 will now be explained with reference to FIG. 4. Common conditions in these experiments are as follows. Employed as an optical fiber preform 2 to be drawn was one having an outer diameter of 70 mm and comprising a core portion made of pure silica glass and a cladding portion made of fluorine-doped glass. From this optical fiber preform 2, an optical fiber 3 having an outer diameter of 125 μm was drawn. The temperature of the drawing furnace was set to about 2000° C. in terms of the surface temperature at the inner peripheral face of the muffle tube (the surface facing the surface of the optical fiber preform 2 or optical fiber 3).

Examples 1 to 3 are examples based on the methods of making an optical fiber in accordance with the above-mentioned first to third embodiments, whereas Comparative Examples 1 to 4 are comparative examples carried out for comparison with the examples based on the methods of making an optical fiber in accordance with the above-mentioned first to third embodiments.

EXAMPLE 1

Using the drawing apparatus 1 in the first embodiment, the optical fiber 3 was drawn at a drawing rate of 400 m/min. The protecting tube 21 was set so as to have an inner peripheral diameter of 30 mm and a total length of 1000 mm. The length L1 of the buffer chamber 41 in the drawing direction of the optical fiber 3 was 100 mm, whereas the length L2 of the muffle tube extension 16 in the drawing direction of the optical fiber 3 was 50 mm. The temperature (entrance temperature) of the optical fiber immediately before it entered the buffer chamber 41 was presumed to be 1800° C. in terms of the surface temperature of the optical fiber, whereas the temperature (entrance temperature) of the optical fiber immediately before it entered the protecting tube 21 was presumed to be 1650° C. in terms of the surface temperature of the optical fiber. In the protecting tube 21, the part of drawn optical fiber 3 yielding a temperature ranging from 1650 to 1000° C. was considered to be cooled at a rate of about 4300° C./sec on average in a segment of 1000 m, which was the total length of the protecting tube 21. The He gas concentration was 100% within the muffle tube extension 16, gradually decreased in the buffer chamber 41 (where the He gas concentration was 0 to 100%), and was 0% (the air concentration was 100%) within the protecting tube 21.

The transmission loss (transmission loss with respect to light having a wavelength of 1.55 μm) of the drawn optical fiber was measured and found to be 0.170 dB/km, whereas the Rayleigh scattering ratio determined from data used for measuring a wavelength characteristic of the transmission loss was 0.85 dB$\mu$m$^4$/km. The outer diameter of the drawn optical fiber was measured and found to be 125±0.15 μm, whereby the fluctuation in optical fiber diameter was ±0.15 μm. On the other hand, "fiber curl abnormality ratio" was 0%. Here, the radius of curvature of the optical fiber was measured at different positions thereof, parts yielding a radius of curvature not smaller than a predetermined value (4.2 m in this Example) were considered defective, and the ratio of the number of positions where defects were detected to the number n of the measured positions (n=10 in this Example) was represented in terms of percentage as "fiber curl abnormality ratio."

EXAMPLE 2

Using the drawing apparatus 101 in the second embodiment, the optical fiber 3 was drawn at a drawing rate of 400 m/min. The protecting tube 21 was set so as to have an inner peripheral diameter of 30 mm and a total length of 1000 mm. The length L3 of the buffer chamber 141 in the drawing direction of the optical fiber 3 was 50 mm, and the length L2 of the muffle tube extension 16 in the drawing direction of the optical fiber 3 was also 50 mm. The temperature (entrance temperature) of the optical fiber immediately before it entered the buffer chamber 141 was presumed to be 1800° C. in terms of the surface temperature of the optical fiber, whereas the temperature (entrance temperature) of the optical fiber immediately before it entered the protecting tube 21 was presumed to be 1650° C. in terms of the surface temperature of the optical fiber. In the protecting tube 21, the part of drawn optical fiber 3 yielding a temperature ranging from 1720 to 1050° C. was considered to be cooled at a rate of about 4460° C./sec on average in a segment of 1000 m, which was the total length of the protecting tube 21. The He gas concentration was 100% within the muffle tube extension 16, and was 0% within the protecting tube 21 (having an atmosphere of air or $N_2$ atmosphere).

The transmission loss (transmission loss with respect to light having a wavelength of 1.55 μm) of the drawn optical fiber was measured and found to be 0.170 dB/km, whereas the Rayleigh scattering ratio determined from data used for measuring a wavelength characteristic of the transmission loss was 0.85 dB$\mu$m$^4$/km. The outer diameter of the drawn optical fiber was measured and found to be 125±0.15 μm, whereby the fluctuation in optical fiber diameter was ±0.15 μm. On the other hand, "bending abnormality ratio" was 0%.

EXAMPLE 3

Using the drawing apparatus 201 in the third embodiment, the optical fiber 3 was drawn at a drawing rate of 400 m/min. The protecting tube 21 was set so as to have an inner peripheral diameter of 30 mm and a total length of 1000 mm. The length L4 of the buffer chamber 241 in the drawing direction of the optical fiber 3 was 50 mm, and the length L2 of the muffle tube extension 16 in the drawing direction of the optical fiber 3 was also 50 mm. Using the gas supply unit 261 and the gas supply path 262, the $N_2$ gas was supplied from the inlet duct 247 to the second buffer cell 245 by 3 l/min. The temperature (entrance temperature) of the optical fiber immediately before it entered the buffer chamber 241 was presumed to be 1800° C. in terms of the surface temperature of the optical fiber, whereas the temperature (entrance temperature) of the optical fiber immediately before it entered the protecting tube 21 was presumed to be 1720° C. in terms of the surface temperature of the optical fiber. In the protecting tube 21, the part of drawn optical fiber 3 yielding a temperature ranging from 1720 to 1050° C. was considered to be cooled at a rate of about 4460° C./sec on average in a segment of 1000 m, which was the total length of the protecting tube 21. The He gas concentration was 100% within the muffle tube extension 16, and was 0% within the protecting tube 21 (having an atmosphere of air or $N_2$ atmosphere).

The transmission loss (transmission loss with respect to light having a wavelength of 1.55 μm) of the drawn optical fiber was measured and found to be 0.170 dB/km, whereas the Rayleigh scattering ratio determined from data used for measuring a wavelength characteristic of the transmission loss was 0.85 dB$\mu$m$^4$/km. The outer diameter of the drawn optical fiber was measured and found to be 125±0.15 $\mu$m, whereby the fluctuation in optical fiber diameter was ±0.15 $\mu$m. On the other hand, "bending abnormality ratio" was 0%.

COMPARATIVE EXAMPLE 1

Figure 5:
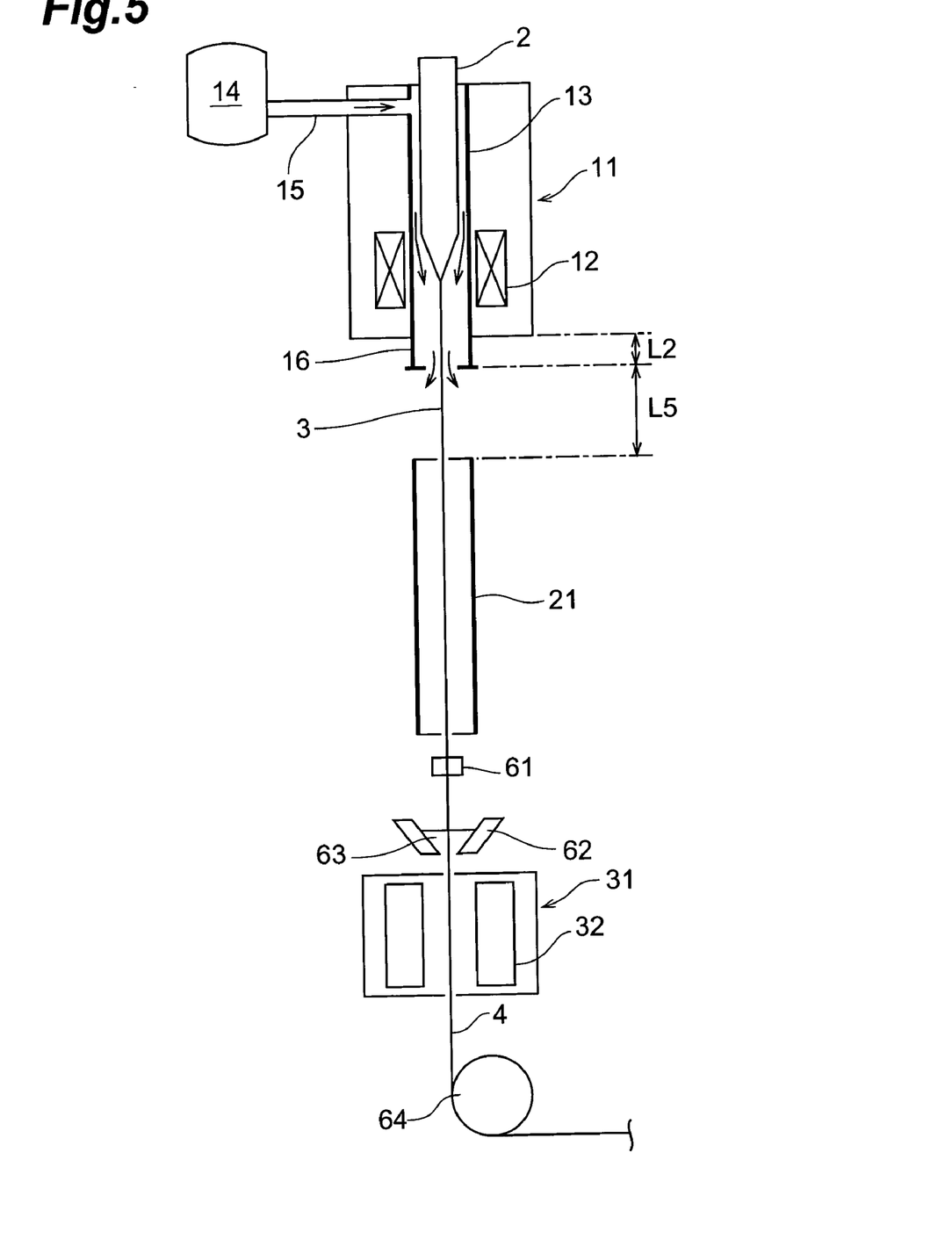
FIG. 5 is a schematic explanatory view showing a method of making an optical fiber in accordance with a Comparative Example.

As shown in FIG. 5, an optical fiber was drawn in a configuration with the buffer chambers 41, 141, 241 being removed. The distance L5 between the muffle tube extension 16 and the protecting tube 21 was 50 mm, and the length L2 of the muffle tube extension 16 in the drawing direction of the optical fiber 3 was also 50 mm. The other experimental conditions were identical to those in Example 1.

The transmission loss (transmission loss with respect to light having a wavelength of 1.55 $\mu$m) of the drawn optical fiber was measured and found to be 0.172 dB/km, whereas the Rayleigh scattering ratio determined from data used for measuring a wavelength characteristic of the transmission loss was 0.86 dB$\mu$m$^4$/km. The outer diameter of the drawn optical fiber was measured and found to be 125±0.4 $\mu$m, whereby the fluctuation in optical fiber diameter was ±0.4 $\mu$m. On the other hand, "bending abnormality ratio" was 20%.

COMPARATIVE EXAMPLE 2

Figure 6:
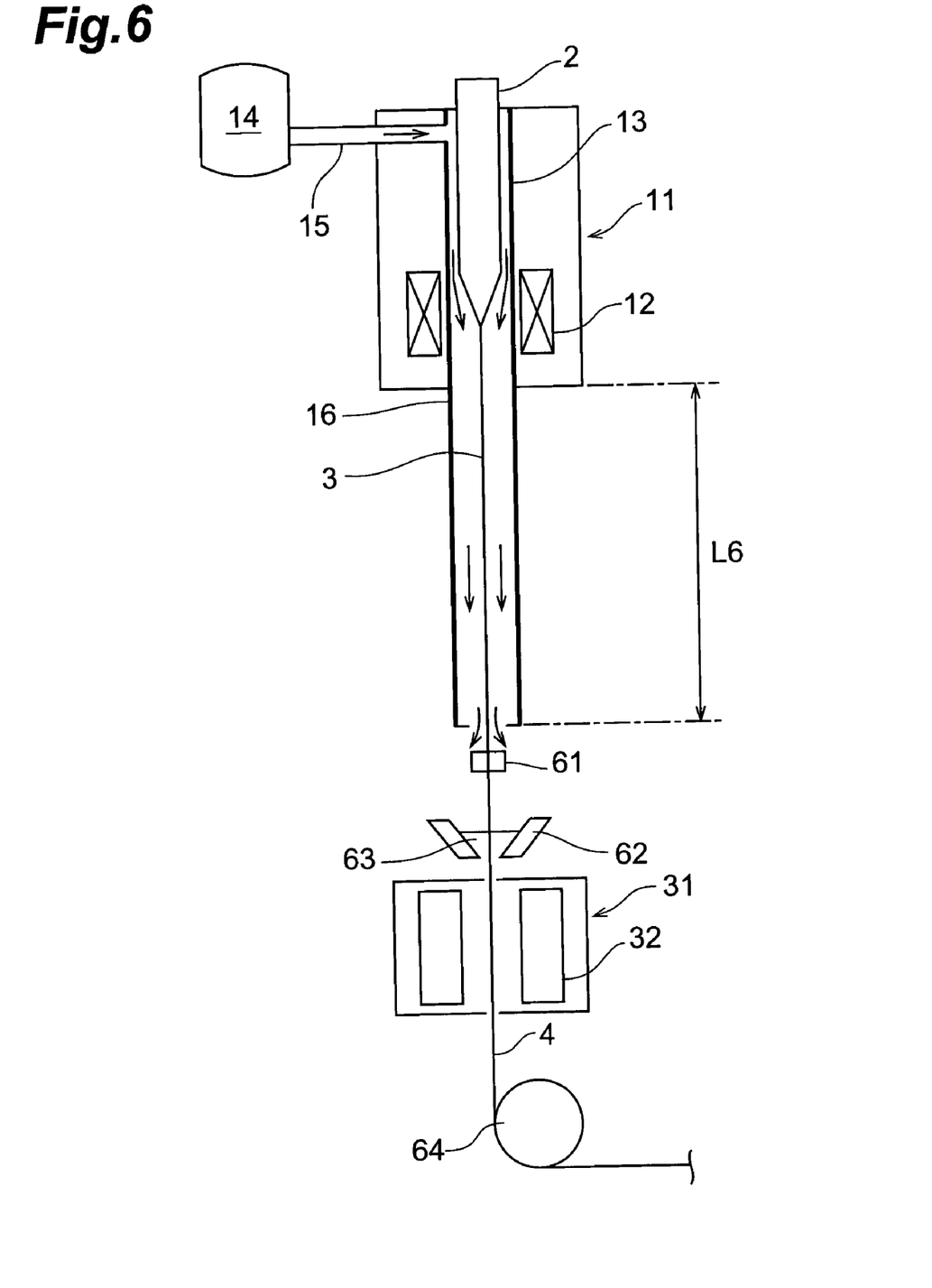
FIG. 6 is a schematic explanatory view showing a method of making an optical fiber in accordance with a Comparative Example.

As shown in FIG. 6, an optical fiber was drawn in a configuration with the protecting tube 21 being removed. The length L6 of the muffle tube extension 16 in the drawing direction of the optical fiber 3 was 0.5 m. The other experimental conditions were identical to those in Example 1.

The transmission loss (transmission loss with respect to light having a wavelength of 1.55 $\mu$m) of the drawn optical fiber was measured and found to be 0.175 dB/km, whereas the Rayleigh scattering ratio determined from data used for measuring a wavelength characteristic of the transmission loss was 0.87 dB$\mu$m$^4$/km. The outer diameter of the drawn optical fiber was measured and found to be 125±0.15 $\mu$m, whereby the fluctuation in optical fiber diameter was ±0.15 $\mu$m. On the other hand, "bending abnormality ratio" was 0%.

COMPARATIVE EXAMPLE 3

An optical fiber was drawn in a configuration without the protecting tube 21. The length L2 of the muffle tube extension 16 in the drawing direction of the optical fiber 3 was 50 cm. The other experimental conditions were identical to those in Example 1.

The transmission loss (transmission loss with respect to light having a wavelength of 1.55 $\mu$m) of the drawn optical fiber was measured and found to be 0.170 dB/km, whereas the Rayleigh scattering ratio determined from data used for measuring a wavelength characteristic of the transmission loss was 0.85 dB$\mu$m$^4$/km. The outer diameter of the drawn optical fiber was measured and found to be 125±1 $\mu$m, whereby the fluctuation in optical fiber diameter was ±1 $\mu$m. On the other hand, "bending abnormality ratio" was 30%.

COMPARATIVE EXAMPLE 4

An optical fiber was drawn while only the setting concerning the drawing rate was changed in the experimental conditions of Example 1. The drawing rate was set to 100 m/min. The temperature (entrance temperature) of the optical fiber immediately before it entered the buffer chamber 41 was presumed to be 1300° C. in terms of the surface temperature of the optical fiber, whereas the temperature (entrance temperature) of the optical fiber immediately before it entered the protecting tube 21 was presumed to be 1000° C. in terms of the surface temperature of the optical fiber.

The transmission loss (transmission loss with respect to light having a wavelength of 1.55 $\mu$m) of the drawn optical fiber was measured and found to be 0.175 dB/km, whereas the Rayleigh scattering ratio determined from data used for measuring a wavelength characteristic of the transmission loss was 0.87 dB$\mu$m$^4$/km. The outer diameter of the drawn optical fiber was measured and found to be 125±0.15 $\mu$m, whereby the fluctuation in optical fiber diameter was ±0.15 $\mu$m. On the other hand, "bending abnormality ratio" was 0%.

In Examples 1 to 3, as mentioned in the foregoing, the Rayleigh scattering ratio was 0.85 dB$\mu$m$^4$/km, and the transmission loss with respect to light having a wavelength of 1.55 $\mu$m was 0.170 dB/km, whereby the transmission loss was lowered by reducing the Rayleigh scattering ratio as compared with Comparative Example 2 yielding a Rayleigh scattering loss of 0.87 dB$\mu$m$^4$/km and a transmission loss of 0.175 dB/km with respect to light having a wavelength of 1.55 $\mu$m, in which the muffle tube extension 16 was made longer.

Also, Examples 1 to 3 yielded an optical fiber diameter fluctuation of ±0.15 $\mu$m and a "bending abnormality ratio" of 0%, thus being able to suppress the occurrence of optical fiber diameter fluctuations and the deterioration in the bending of optical fiber as compared with Comparative Example 1 yielding an optical fiber diameter fluctuation of ±0.4 $\mu$m and a "bending abnormality ratio" of 20%, in which the drawing was carried out with the buffer chambers 41, 141, 241 being removed while the gap L5 was formed between the drawing furnace 11 and the protecting tube 21, and Comparative Example 3 yielding an optical fiber diameter fluctuation of ±1 $\mu$m and a "bending abnormality ratio" of 30%, in which the protecting tube 21 was removed.

On the other hand, Comparative Example 4 yielded a Rayleigh scattering ratio of 0.85 dB$\mu$m$^4$/km and a transmission loss of 0.175 dB/km with respect to light having a wavelength of 1.55 $\mu$m, whereby its transmission loss was higher than that in Example 1 in which the drawing rate was 400 m/min. This is considered to be because of the fact that the optical fiber 3 was rapidly cooled with the He gas before leaving the muffle tube extension 16 since the drawing rate was slow, i.e., 100 m/min, in Comparative Example 4.

Thus, as can be seen from the above-mentioned results of experiments, since the protecting tube 21 is provided with a predetermined gap with respect to the muffle tube extension 16 whereas the gap between the protecting tube 21 and the drawing furnace 11 is a gas mixture layer (buffer chambers 41, 141, 241) in which the He gas and the air exist in a mixed state, an atmosphere constituted by the He gas is kept within the drawing furnace 11 while the He gas and the air exist in a mixed state within the buffer chambers 41, 141, 241 in the method of making an optical fiber in accordance with this embodiment. The atmosphere constituted by the air is maintained within the protecting tube 21, whereby the cooling rate of the optical fiber within the protecting tube 21 can be slowed down. Also, since the entrance temperature at which the drawn optical fiber 3 enters the gas mixture layer is set to a temperature within the range of 1400 to 1800° C., the cooling rate of the part of optical fiber 3 yielding a temperature of 1200 to 1700° C. is slowed down in a predetermined segment thereof. As a result, the structural relaxation of the optical fiber 3 proceeds in a short period of time, so that the randomness in atomic arrangement is lowered, whereby the optical fiber 3 whose transmission loss is lowered by reducing its Rayleigh scattering intensity can be made in a very short period of time from the drawing upon heating to the resin coating. For further lowering the transmission loss by reducing the Rayleigh scattering intensity, the entrance temperature at which the drawn optical fiber 3 enters the gas mixture layer is preferably set within the range of 1600 to 1800° C.

Since the gas mixture layer exists between the protecting tube 21 and the drawing furnace 11, the dust occurring within the drawing furnace 11 can be restrained from entering the protecting tube 21, and the turbulence of outside air flow between the drawing furnace 11 and the protecting tube 21 becomes less influential, whereby the occurrence of the fluctuation in optical fiber diameter or the deterioration in bending of the optical fiber can be suppressed.

Since the buffer chambers 41, 141, 241 have the barriers 43, 46, 142, 243, 246, the influence of the turbulence of outside air flow can be suppressed more reliably, whereby the occurrence of the fluctuation in optical fiber diameter or the deterioration in bending of the optical fiber can further be suppressed.

Since the He gas and the dust occurring within the drawing furnace 11 are let out to the outside air from the outlet holes 44 formed in the barrier 43, the outlet ducts 47 formed in the barrier 46, the outlet ducts 22 formed in the protecting tube 21, the outlet duct 144 formed in the barrier 142, the outlet holes 244 formed in the barrier 243, or the like, the atmosphere constituted by the He gas within the drawing furnace 11 and the atmosphere constituted by the air within the protecting tube 21 can be switched therebetween efficiently and reliably.

Since the barrier 142 for separating the buffer chamber 141 from the outside air is formed with the inlet duct 143 for introducing the $N_2$ gas fed from the $N_2$ gas supply unit 151 by way of the $N_2$ gas supply path 152 is formed, so as to introduce the $N_2$ gas into the buffer chamber 141 from the inlet duct 143, the He gas flowing from within the drawing furnace 11 and the dust occurring within the drawing furnace 11 are actively let out from the outlet duct 144 formed in the barrier 142, whereby the dust occurring within the drawing furnace 11 can further be restrained from entering the protecting tube 21.

Since the barrier 246 for separating the second buffer cell 245 from the outside air is formed with an inlet duct 247 for introducing the air or $N_2$ gas fed from the gas supply unit 261 by way of the gas supply path 262, so as to introduce the air or $N_2$ gas into the second buffer cell 245 from the inlet duct 247, the dust occurring within the drawing furnace 11 can further be restrained from entering the protecting tube 21.

Though the buffer chambers 41, 241 in the drawing apparatus 1 are constituted by the first buffer cells 42, 242 and the second buffer cells 45, 245 in the first and third embodiments, they are not restricted thereto and may be configured so as to provide three or more cells.

In the first to third embodiments, it is not always necessary to provide the buffer chambers 41, 141, 241 themselves as long as a gas mixture layer exists between the muffle tube extension 16 and the protecting tube 21. In this case, the drawing furnace 11 (the muffle tube extension 16) and the protecting tube 21 are disposed close to each other, for example, such that the distance L1 between the drawing furnace 11 (the muffle tube extension 16) and the protecting tube 21 is about 10 mm, whereby the space between the drawing furnace 11 and the protecting tube 21 becomes a gas mixture layer in which the He gas, which becomes an atmosphere gas within the drawing furnace 11 (the muffle tube 13), and a predetermined gas (air, $N_2$ gas, or the like), which becomes the atmosphere gas within the protecting tube 21, exist in a mixed state, thus attaining a state substantially separated from the outside air, whereby operations and effects similar to those in the case provided with the buffer chambers 41, 141, 241 are exhibited. However, the configuration provided with the buffer chambers 41, 141, 241 are preferably employed in view of the fact that the pressure within the buffer chambers 41, 141, 241 can be set higher than the outside pressure, whereby the turbulence of outside air flow can reliably be made less influential.

The present invention is applicable to the drawing of not only the optical fiber preform comprising a core portion constituted by pure silica glass and a cladding portion constituted by fluorine-doped glass, but also a Ge-doped optical fiber preform whose core portion is doped with Ge, for example.

INDUSTRIAL APPLICABILITY

The apparatus and method of making an optical fiber in accordance with the present invention are utilizable in a drawing apparatus for drawing an optical fiber from an optical fiber preform, and the like.

What is claimed is:

1. A method of making an optical fiber in which an optical fiber preform is drawn upon heating;
    said method using a drawing furnace for drawing said optical fiber preform upon heating in an atmosphere comprising an He gas, and using a protecting tube, disposed with a predetermined gap with respect to said drawing furnace, having therewithin an atmosphere comprising a predetermined gas with a thermal conductivity lower than that of said He gas;
    wherein said gap between said drawing furnace and said protecting tube is a gas mixture layer in which said He gas and said predetermined gas exist in a mixed state;
    wherein said drawn optical fiber enters said gas mixture layer at an entrance temperature within the range of 1400 to 1800° C., while said optical fiber drawn by said drawing furnace is fed into said protecting tube by way of said gas mixture layer;
    wherein a barrier for separating said gas mixture layer from an outside air is provided;
    wherein said barrier is formed with a gas outlet for letting out at least said He gas; and
    wherein at least said He gas is let out from said gas outlet to said outside air.

2. A method of making an optical fiber according to claim 1, wherein said barrier is formed with a gas inlet; and
    wherein said predetermined gas is introduced inside said barrier from said gas inlet.

* * * * *